United States Patent [19]

Tomii et al.

[11] Patent Number: 4,694,225

[45] Date of Patent: Sep. 15, 1987

[54] METHOD OF DRIVING A FLAT TYPE OF CATHODE RAY TUBE TO PROVIDE UNIFORMITY OF ELECTRON BEAM EMISSION CHARACTERISTICS FOR A PLURALITY OF BEAM SOURCES

[75] Inventors: Kaoru Tomii, Isehara; Kiyoshi Hamada, Osaka, both of Japan

[73] Assignee: Matsushita Electric Industrial Co., Ltd., Japan

[21] Appl. No.: 913,593

[22] Filed: Sep. 30, 1986

[30] Foreign Application Priority Data

Sep. 30, 1985 [JP] Japan .................. 60-217060

[51] Int. Cl.$^4$ ............................. H07J 29/70
[52] U.S. Cl. ................... 315/366; 315/383; 313/422
[58] Field of Search ............. 315/366, 383; 313/422

[56] References Cited

U.S. PATENT DOCUMENTS 4,525,653  6/1985  Smith .................... 315/366
4,626,899  12/1986  Tomii et al. ............. 315/366

FOREIGN PATENT DOCUMENTS

0094342  5/1984  Japan ..................... 315/366
0112551  6/1984  Japan ..................... 315/366

Primary Examiner—Theodore M. Blum
Assistant Examiner—David Cain
Attorney, Agent, or Firm—Lowe, Price, LeBlanc, Becker & Shur

[57] ABSTRACT

A method of producing uniformity of emission a characteristics of a plurality of electron beam sources in a cathode ray tube, by deriving and storing data values for producing respective correction voltages to be applied to modify the emission characteristics. Each data value is obtained by sensing a current which flows through one of the control electrodes when a high voltage electrode is set to a relatively low potential, comparing this current with a reference value and storing the difference for use in subsequently producing a correction voltage. Data values are derived during successive time intervals, with corresponding correction voltages being successively applied to achieve feedback operation, for greater correction accuracy.

13 Claims, 12 Drawing Figures

METHOD OF DRIVING A FLAT TYPE OF CATHODE RAY TUBE TO PROVIDE UNIFORMITY OF ELECTRON BEAM EMISSION CHARACTERISTICS FOR A PLURALITY OF BEAM SOURCES

BACKGROUND OF THE INVENTION

The present invention relates to a method of driving a cathode ray tube having a flat configuration, for use in such applications as color TV receivers, computer display terminals, etc.

Such a flat type of cathode ray tube contains a plurality of electron beam sources for producing respective electron beams, a group of control electrodes for modulating the levels of beam current of the respective electron beams in accordance with display data, and a group of focusing and deflection electrodes for producing horizontal and vertical deflection of the electron beams before the beams fall upon light-emitting material of the cathode ray tube screen. Generation and deflection of the respective electron beams are coordinated such as to combine the effects of the electron beams to produce a display picture on the cathode ray tube screen. With such a cathode ray tube, assuming a condition in which identical potentials are applied to all of the control electrodes, the levels of electron beam emission should ideally be identical for all of the emission sources. That is to say, if the data to be displayed represents a completely uniform level of display screen brightness (e.g. a completely white screen), then such a uniform display condition should be produced. However in practice, with prior art drive methods for such cathode ray tubes, this condition is not attained. Due to such factors as differences in the coating material formed on the cathodes to produce electron emission, slight deviations in size between different apertures in the control electrode through which the electron beams are passed, etc, it is found that there are significant differences between the emission characteristics of the electron beam sources. These differences result in conspicuous variations in screen brightness over the display screen, under a condition in which uniform display brightness should be produced.

In the following, the relationship between voltage applied between an electron beam source and a corresponding control electrode and the resultant level of electron beam current will be referred to as the beam emission characteristic, i.e. the problem of the prior art described above is a result of non-uniformity of beam emission characteristics between different electron beam sources of the cathode ray tube.

SUMMARY OF THE INVENTION

It is an objective of the present invention to overcome the problem described above of prior art methods of driving a flat type of cathode ray tube, by providing a method of driving such a cathode ray tube whereby automatic correction is performed to provide substantially completely uniform beam emission characteristics for a plurality of electron beam sources of a flat type of cathode ray tube.

To achieve this objective, electron beam currents emitted by the respective sources are successively sensed and compared with a reference current level which corresponds to a predetermined amount of electron beam emission, and the difference between each sensed current value is stored in a memory. When all of these current difference values have been stored, the above process is repeated, with the memorized values being successively read out and used to produce corresponding values of correction voltage which are applied to the control electrodes such as to reduce the amount of current difference, and with the memorized values being added to the resultant newly measured current difference values and the addition results being successively memorized. This comparison, addition and memorization process is repeated one or more times, for all of the electron beam sources. A set of data values are thereby left stored in the memory which, when converted to correction voltage values and applied to the control electrodes at the timings of emission of corresponding electron beams, will cause the emission characteristics of the respective beams to be made substantially uniform.

More specifically, the present invention comprises a method of driving a flat type of cathode ray tube having a plurality of electron beam sources for producing respective electron beams, each of the electron beam sources comprising cathode, a first group of electrodes comprising at least a first electrode for regulating a level of current of the corresponding electron beam and a second electrode disposed outward of the first electrode along the path of the electron beam for generating an electric field to produce the electron beam, and a second group of electrodes disposed outward of the first group of electrodes along the electron beam path, and respectively coupled to receive predetermined values of high voltage for focusing and deflecting the electron beam, the method comprising:

changing the voltage applied to one of the second group of electrodes to a fixed value which is substantially lower than the high voltage value;

sequentially deriving corresponding correction voltage values for each of the electron beam sources by:

enabling emission of an electron beam from the electron beam source by applying a fixed control voltage to the first electrode during a first time interval of fixed duration;

during the first time interval, sensing a current which flows from the electron beam passing into one of the second group of electrodes, and comparing the level of the sensed current with a fixed reference current value to obtain a first current difference value;

storing the first current difference value in a memory, and;

following completion of the first time interval, reading out the stored current difference value from the memory, deriving a first value of correction voltage based on the current difference value, applying the correction voltage such as to modify a potential difference between the cathode and the first group of electrodes in a direction tending to reduce the difference between the sensed current value and the reference current value, and restoring the voltage applied to the one of the second group of electrodes from the low to the high voltage level.

DESCRIPTION OF THE PREFERRED EMBODIMENTS

Figure 1:
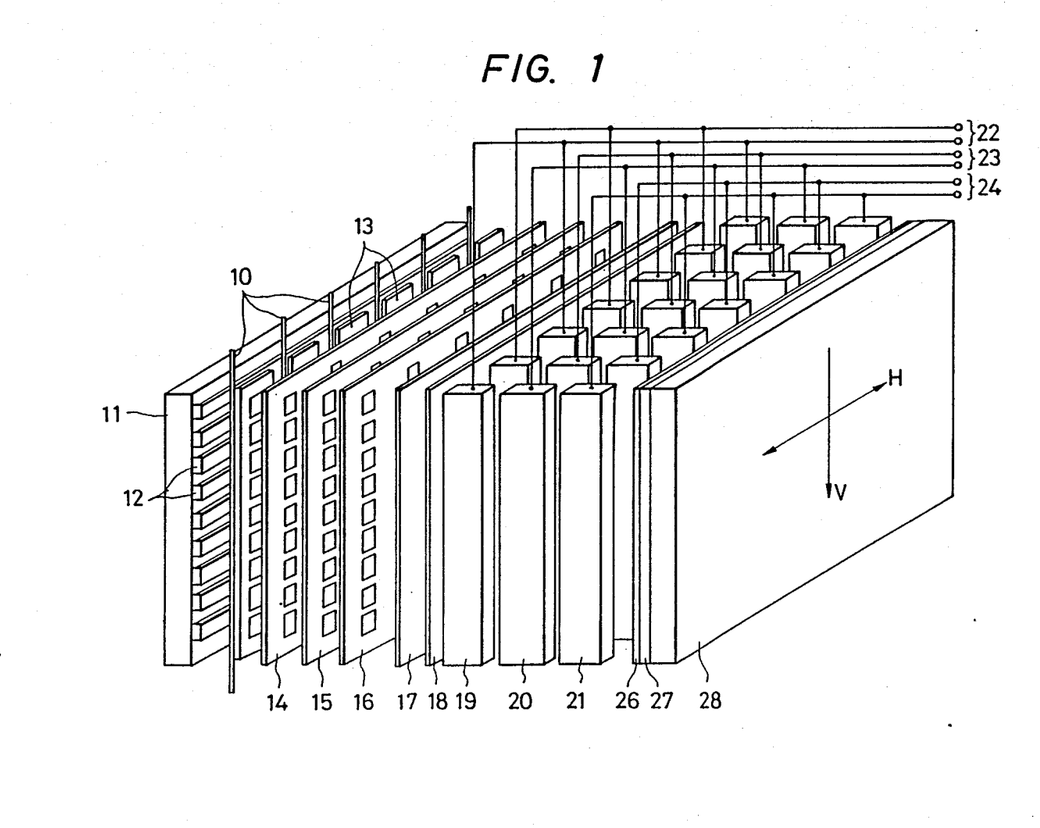
FIG. 1 is a diagram illustrating the interior components of a flat type of cathode ray tube, with a surrounding evacuated containing vessel omitted.
Figure 2A:
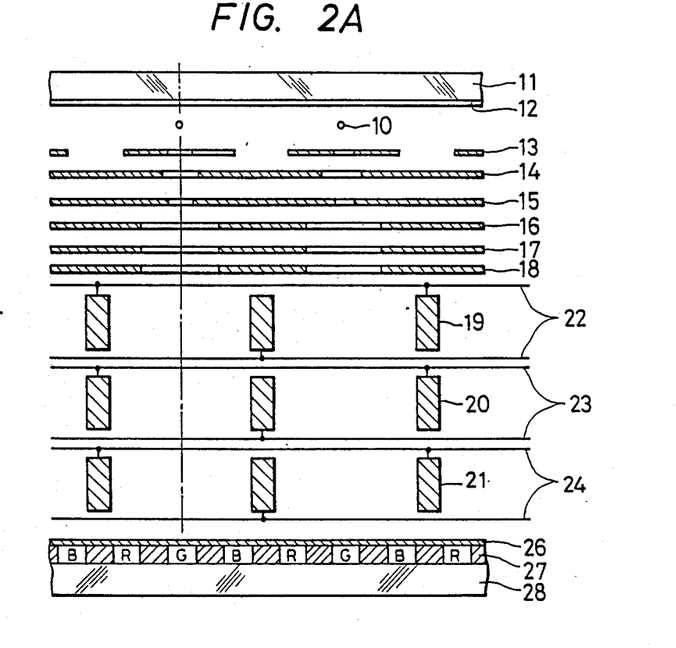
FIGS. 2A and 2B are a partial view in plan and in side elevation, respectively, of the cathode ray tube of FIG. 1.
Figure 2B:
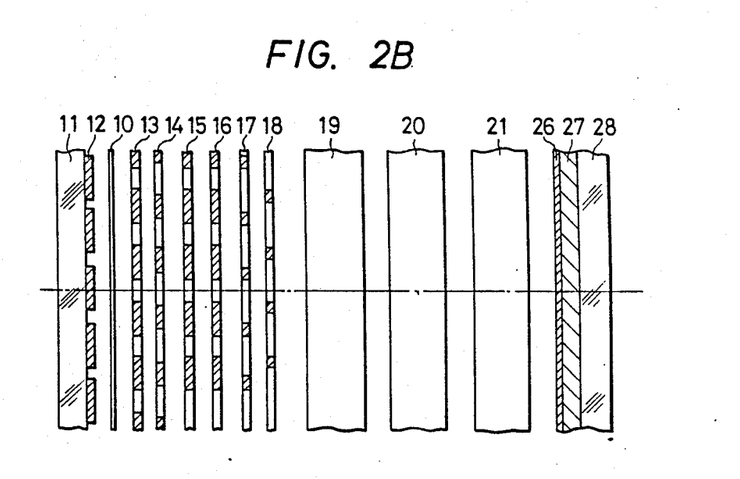

Referring first to FIGS. 1 and 2A, 2B, a description will be given of a specific example of a flat type of cathode ray tube. This cathode ray tube has been disclosed by the assigneee of the present invention, in U.S. patent application No. 798,335. The vacuum enclosure (e.g. glass vessel) of the cathode ray tube is omitted from the drawings, for greater clarity in describing the internal elements. Generally speaking, such a cathode ray tube is used to display characters, images etc when oriented as shown in FIG. 1, in which the horizontal direction is indicated by an arrow H and the vertical direction is indicated by an arrow V, and this arbitrarily selected orientation will be assumed throughout the following description. Numeral 10 denotes a plurality of line cathodes, each consisting of an elongated linear filament which can be formed for example of tungsten wire which is coated with a suitable oxide material. The line cathodes 10 are oriented vertically, and arrayed at regular intervals along the horizontal direction. A supporting plate 11, formed of an electrically insulating material, is disposed closely adjacent to the array of line cathodes 10 on the opposite side of the line cathodes 10 to a faceplate 28. A set of vertical scanning electrodes 12 is formed upon the inner surface of the supporting plate 11, facing the line cathodes 10. The vertical scanning electrodes 12 are mutually electrically separate, and are each of narrow elongated shape, aligned horizontally, and successively arrayed at regular spacings along the vertical direction. The number of vertical scanning electrodes 12, in the case of a cathode ray tube for displaying a broadcast television signal, will be ½ of the number of horizontal scanning lines (which is 480 in the NTSC system for example). Numeral 13 denotes a set of first electrodes which function as control electrodes, i.e. control electrodes formed of elongated plate members which are vertically aligned at regular spacings along the horizontal direction, such as to be opposite and closely adjacent to corresponding ones of the line cathodes 10, which and are each formed with a single column of apertures arrayed at regular spacings along the vertical direction, each of these apertures being positioned immediately opposite a corresponding one of the line cathodes 10, for passing a specific electron beam, as is clearly shown in FIG. 2A. The electrodes 13 function as control electrodes, since the potential difference between each of electrodes 13 and the corresponding one of line cathodes 10 will determine the amount of beam current of an electron beam which is emitted by the cathode 10 and passes through an aperture in the corresponding electrode 13. The electrodes 13 will be referred to in the following as the G1 electrodes.

Numeral 14 denotes a second electrode which will be referred to as the G2 electrode, disposed immediately succeeding the G1 electrodes along the electron beam path, having apertures formed therein at positions corresponding to those in the G1 electrodes 13. A third electrode G3 denoted by reference numeral 15 is positioned immediately succeeding the G2 electrode along the embodiment path, and is formed with an array of apertures corresponding in position to those of the G1 electrodes 13. The G2 electrode 14 serves to generate electron beams from the line cathodes 10, while the G3 electrode 15 serves to shield the beam-generating electric field produced by the G2 electrode 14 from electric fields which are produced by electrodes subsequently disposed along the electron beam path, and described hereinafter.

The next electrode disposed along the beam path (i.e. along the direction from left to right as seen in FIGS. 1 and 2B) is a fourth electrode G4 designated by numeral 16. The G4 electrode 16 is formed with an array of apertures in positions corresponding to those of the G1 electrodes, but with each of these apertures having a horizontal dimension which is substantially greater than its vertical dimension. The next electrodes successively disposed along the beam direction are designated by numerals 17 and 18, each being formed with an array of apertures which are elongated in the horizontal direction, as for the apertures in the G4 electrode 16. As shown in FIG. 2B, the centers of the apertures formed in electrodes 17 and 18 are mutually displaced along the vertical direction. These electrodes 17 and 18 are utilized to produce selective vertical deflection of the electron beam.

The next electrodes disposed along the beam path are a plurality of horizontal deflection electrodes formed of elongated vertically aligned plates which are arranged as three sets, designated as 19, 20 and 21 respectively. The electrodes in each of these sets are positioned at regular spacings along the horizontal direction, at positions which are midway between the positions of respective pairs of the line cathodes 10, as is clearly seen from FIG. 2A. The first of these horizontal deflection electrodes along the beam path, designated by numeral 19, will be referred to in the following as the DH-1 electrodes, while the second group 20 will be referred to as the DH-2 electrodes and the third group 21 will be referred to as the DH-3 electrodes. Alternating ones of the set of DH-1 electrodes 19 are connected to respective ones of a pair of bus leads 22. Similarly, alternating ones of the set of DH-2 electrodes 20 are connected to respective ones of a pair of bus leads 23, and alternating ones of the set of DH-1 electrodes 21 are connected to respective ones of a pair of bus leads 24. A high DC potential is applied to DH-3 21 which is identical to that which is applied to a metal back electrode 26 formed over a photo-emissive layer 27 on the inner surface of the faceplate 28. Varying voltages are applied to the DH-2 electrodes 20 and the DH-1 electrodes 19 such as to produce horizontal deflection of the electron beams.

The cathode ray tube of this example is for color display, so that the phosphor layer 27 is made up of sequential red-emissive, green-emissive and blue-emissive stripes formed of suitable phosphor materials, (indicated as R, G and B in FIG. 2A), which are mutually separated by black stripes.

The operation of flat type of cathode ray tube having the configuration described above is as follows. Current is passed through the line cathodes 10 to produce heating and hence electron emission. The cathodes 10 are connected to a fixed voltage level, and if it is assumed that a voltage is applied to the vertical scanning electrodes 12 and to the first electrodes 13 which is substantially identical to the voltage of cathodes 10, and that a voltage which is substantially high (e.g. 100 to 300 V) and is positive with respect to the potential of cathodes 10 is applied to the G2 electrode 14, then the electrons emitted by the cathodes 10 will pass through the apertures in the G1 electrodes to form respective electron beams. The potential between the G1 electrodes and the cathodes 10 will determine the amount of beam current of such an electron beam, so that the G1 electrodes constitute a set of control electrodes, to which control voltages are applied to modulate the electron beams. However the electron beam current can also be modified by varying the voltage applied to the second electrode G2. Since the vertical scanning electrodes are positioned in close proximity to the cathodes 10, the polarity of the voltage applied to the vertical scanning electrodes 12 serves to selectively enable and inhibit the emission of electron beams, i.e. by selectively varying the potential of the space surrounding each cathode 10. At any specific time, during scanning to produce a television image, only one electron beams is emitted from one of the cathodes 10 through one of the apertures in one of the G1 electrodes 13.

This electron beam, after emerging from the G2 electrode 14, sequentially passes through corresponding apertures in the G3 electrode 15, the G4 electrode 16, the vertical deflection electrode 20, 21 and the three sets of horizontal deflection electrodes 19, 20 and 21. Voltages of predetermined levels are applied to electrodes 15 to 21, which result in the electron beam being focussed to form a small spot of suitable size on the phosphor layer 27. Beam focusing in the vertical direction is implemented by an electrostatic lens formed between the G3 electrode 15, G4 electrode 16 and the vertical deflection electrode 17 and 18. Horizontal beam focusing is performed by an electrostatic lens formed between the three sets of horizontal deflection electrodes 19, 20 and 21. These two electrostatic lenses are formed only the horizontal and the vertical directions, so that vertical and horizontal adjustment of the beam spot size can be performed mutually independently, i.e. by adjustment of the voltages applied to the electrodes which form the electrostatic lenses.

Periodically varying deflection voltages of identical amplitude are applied to the buses 22, 23 and 24 which are respectively connected to the horizontal deflection electrodes 19, with these deflection voltages being of sawtooth waveform, triangular waveform or stepwise-varying waveform, to produce horizontal deflection of the electron beam through a predetermined displacement, to thereby execute horizontal scanning of the electron beam across the phosphor layer 27.

Figure 3A:
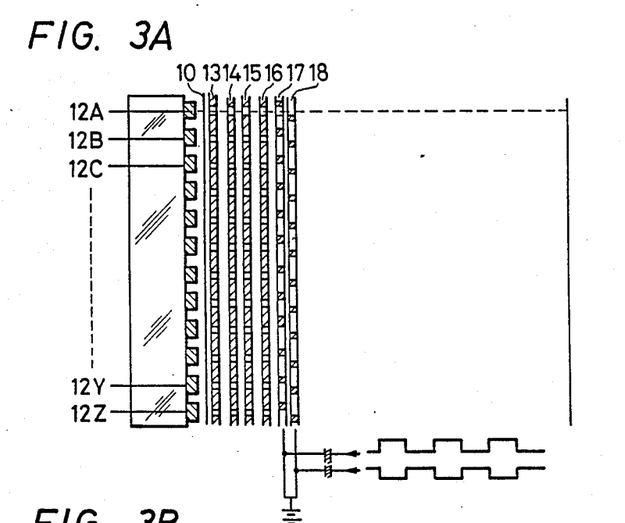
FIG. 3A is a partial view in side elevation of the cathode ray tube of FIG. 1, for assistance in describing vertical scanning operation.
Figure 3B:
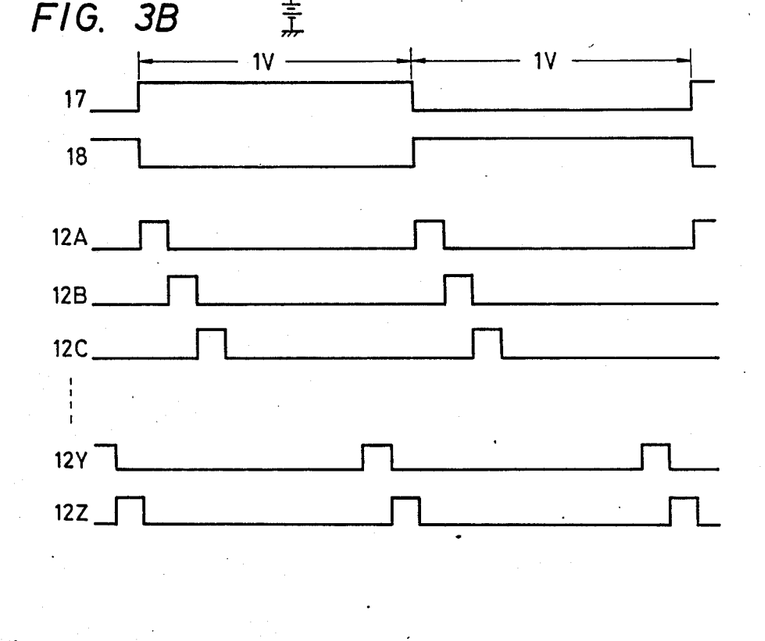
FIG. 3B is a timing diagram for illustrating this scanning operation.

The vertical scanning operation will be described with reference to FIGS. 3A and 3B, which respectively show a vertical cross-sectional portion of the flat type of cathode ray tube shown in FIG. 1 and a timing diagram of signal waveforms applied to the electrodes. A voltage level applied to one of the vertical scanning electrodes 12 which enables electron beams to be emitted from the portions of cathodes 10 respectively positioned immediately adjacent to that vertical scanning electrode will be referred to in the following as an enabling voltage, while a corresponding voltage level which inhibits, i.e. produces cut-off of electron beam emission will be referred to as a cut-off voltage. Vertical scanning is performed by successively applying the enabling voltage to each of the vertical scanning electrodes 12 (i.e. 12A, 12B, 12C, . . . , 12Z shown in FIG. 3A) during one horizontal scanning interval, with the other vertical scanning electrodes being subjected to the cut-off voltage. It will be assumed that interlace scanning is to be performed. During a first field, the vertical scanning electrodes 12 are successively scanned as described above, while a fixed DC voltage and superimposed predetermined voltages are respectively applied to the vertical deflection electrode 17 and 18, as is made clear in FIG. 3A. During the succeeding field, the vertical scanning electrodes 12 are again successively scanned, but with the polarities of the respective superimposed voltages applied to the vertical deflection electrode 17 and 18 being inverted. It can thus be understood that during a first field, vertical deflection electrode 17 will be more positive in potential than vertical deflection electrode 18, while during a second field the opposite condition will be produced. The variations of the relative voltage levels of vertical deflection electrode 17 and 18 are made such as to deflect the electron beams by an amount, between successive fields, which is sufficient to produce interlace scanning across the phosphor layer 27.

Figure 4:
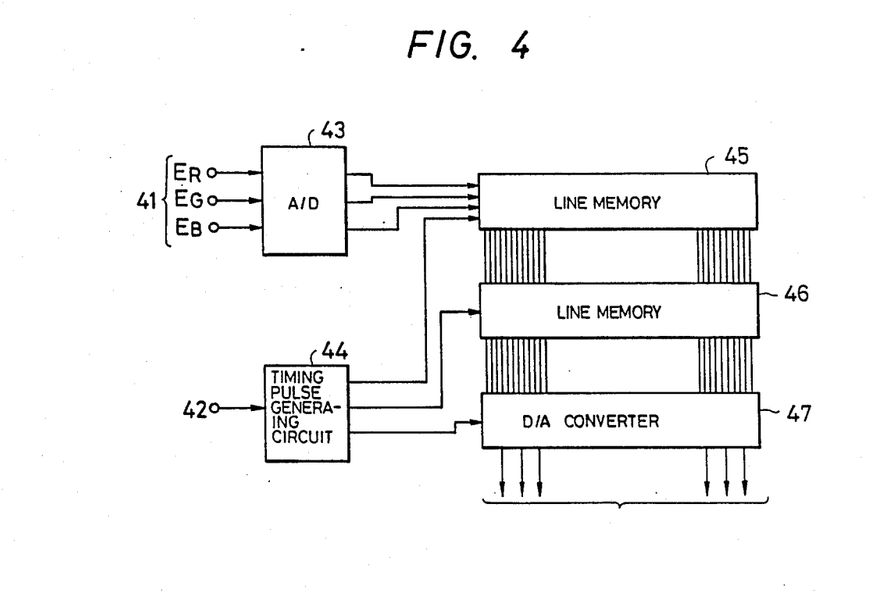
FIG. 4 is a general block circuit diagram for illustrating the manner of generating drive signals to be applied to control electrode in the cathode ray tube of FIG. 1.

The basic signal processing system for a flat type of cathode ray tube as described above will be described referring to FIG. 4, in which numeral 44 denotes a timing pulse generating circuit which produces timing pulses at timings based on those of a television synchronization signal, applied to an input terminal 42. An A/D converter 43 receives three demodulated primary color signals (designated as $E_R$, $E_G$ and $E_B$) corresponding to the red, blue and green primary color components of the video signal, and converts these into digital signals. The resultant digital signal data for one horizontal scanning interval (referred to in the following as a 1H interval) is stored sequentially in a line memory 45, at timings determined by timing pulses from generator 44. When data for a complete horizontal scanning line has been stored in line memory 45, the data is transferred simultaneously in parallel to a second line memory 46. Signals for the next 1H interval then begin to be successively stored in the first line memory 45. The data thus stored in line memory 46 is held stored therein during a 1H interval, during which time the data is applied in parallel to a D/A converter (or pulse-width modulator) 47, to be converted back into analog signal form or into pulse-width modulated signals. These signals are amplified and applied to the modulation electrodes (i.e. the G1 electrodes shown in FIG. 1) of the cathode ray tube. It can thus be understood that the line memories 45 and 46 are used for time axis conversion.

FIG. 5 shows a cross-sectional view in plan of a portion of the internal structure of a flat type of cathode ray tube which is suitable for application of the drive method of the present invention, and a block diagram of a corresponding portion of a circuit system for driving the cathode ray tube according to the present invention, whereby uniformity of emission characteristics of the electron beam sources is ensured. The cathode ray tube configuration shown in FIG. 5 differs from that of FIG. 1 described hereinabove in only one respect, namely the form of the second electrodes 14. In the example of FIG. 1, a plurality of first electrodes 13 are employed, these being formed as mutually separate vertically extending elongated electrodes, each positioned directly opposite a corresponding one of the line cathodes 10, while the second electrode 14 is formed as a single vertically oriented electrode. However in the case of a flat type of cathode ray tube which is suitable for application of the drive method of the present invention, as illustrated in FIG. 5, a plurality of second electrodes 14a are employed (three of which are shown in FIG. 5, designated as G1-1, G1-2 and G1-3 respectively), each being formed as an elongated vertically extending electrode which is positioned in correspondence with one of the cathodes 10. The positions of the apertures formed in the second electrodes 14a are identical to those of the apertures in the G2 electrode 14 of the example of FIG. 1 described above, so that the operation of the cathode ray tube structure of FIG. 5 is basically similar to that of FIG. 1, and differs only in the manner of driving the G2 electrodes 14a.

Figure 5A:
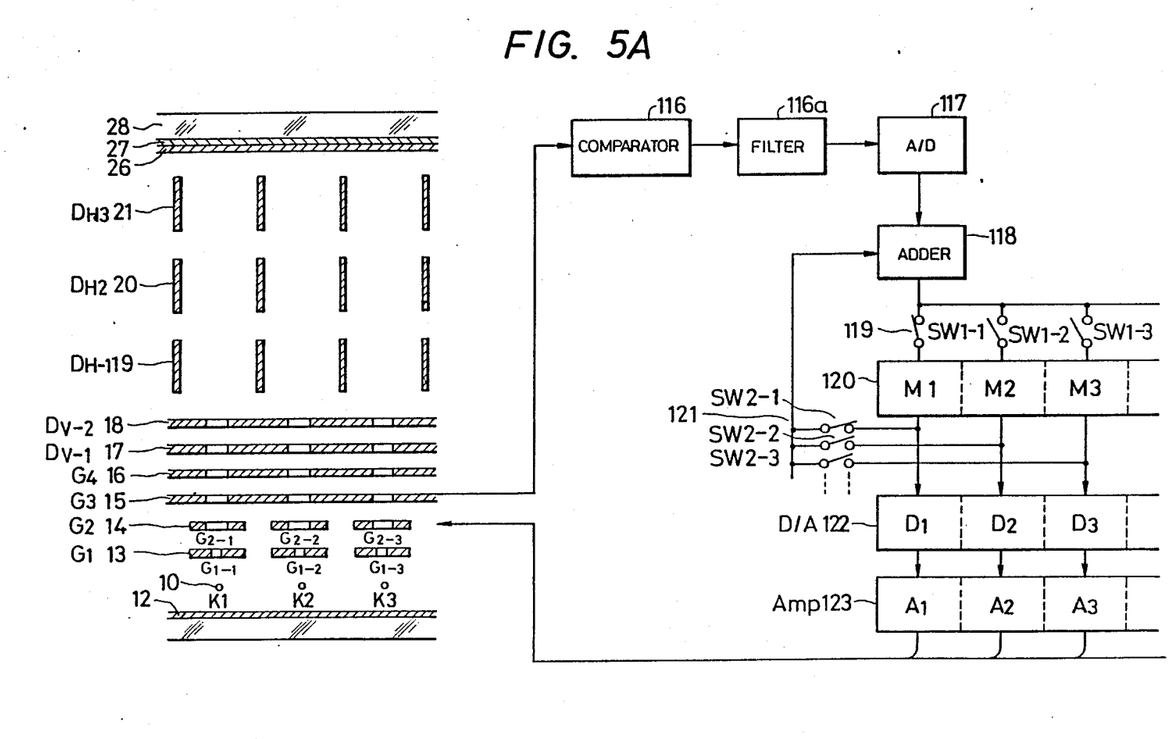
FIG. 5A is a partial view in elevation of a flat cathode ray tube having a plurality of second electrode sections, and an accompanying block diagram of an example of a circuit configuration for electrode drive in accordance with the present invention.

A first embodiment of the drive method of the present invention will be described referring to FIG. 5 and the waveform diagram of FIG. 6. An operating condition of the cathode ray tube is first established whereby compensation data can be derived for use in establishing uniformity of electron beam emission characteristics, as described hereinafter, and is continued until all of the data required for producing uniformity of the emission characteristics of all of the electron beams has been acquired. This condition is established by setting the potential of the G4 electrode 16 (indicated as 132 in FIG. 6) to a level, referred to in the following as the shielding potential, which is substantially lower than then high positive potential which is applied to that electrode during normal display operation. As a result, the electron beams are prevented from travelling towards the display screen, and instead will flow into the G3 electrode 15, which is maintained at a positive potential. Each of the combinations of components which cooperate to produce electron beams from one of the cathodes 10 (e.g. cathode K1, first electrode G1-1, second electrode G2-1, etc in FIG. 5) will be referred to as a horizontal block, i.e. FIG. 5 can be considered to shown three adjacent ones of such horizontal blocks in cross-section.

In this embodiment, the first electrodes G1 are successively supplied with a voltage at a sufficiently high positive potential to enable electron beam emission (which will be referred to as the enabling level) during time intervals of duration equal to an integral number of field intervals, and are otherwise connected to a low potential which produces cut-off of electron beam emission, which will be referred to as the cut-off voltage. In FIG. 6, the duration of a field interval is indicated as 1V, and each of the G1 electrodes is connected to the enabling potential during three successive field intervals (e.g. fields V1, V2 and V3 for electrode G1-1). The process of deriving correction data will be described for the case of the horizontal block containing electrode G1-1. During the first field interval V1, the vertical scanning electrodes are successively driven during 1H intervals as described for the example of FIG. 1, to thereby produce successive electron beams in that horizontal block, passing through corresponding ones of the apertures in electrodes G1-1 and G2 electrodes 14a, with each electron beam being produced during a 1H interval. During each of these 1H intervals, the level of beam current which flows into the G3 electrode 15 is sensed by a current sensor 115, and the sensed current value is compared with a reference current value $I_{ref}$ in a comparator 116, to thereby obtain a current difference value which represents a deviation of the beam current from a predetermined level. This current difference value is applied to a filter 116a, for providing reduction of noise which is produced by subsequent A/D conversion. The filter 116a is a low-pass filter or a low-frequency band-pass filter. The output from the filter 116a is converted into a digital value by an A/D converter 117, and this value is transferred through an adder 118 and a selector switch SW1-1 to a memory section M1 of a memory 120. The memory section M1 serves to store respective difference data values for each of the electron beams produced in the horizontal block which includes cathode K1. An example of the waveform of the current signal produced by current sensor 115 during the first field V1 is indicated as waveform 133 in FIG. 6.

When all of the vertical scanning electrodes have been scanned and the corresponding current difference values for the first horizontal block have been all been stored in memory section M1, i.e. on completion of field V1, the memorized current difference values are successively read out in synchronism with the start of each of the 1H intervals in the next field interval V2, and converted back into analog form by a section D1 of a D/A converter 122. The analog data values thus successively produced are amplified in a section A1 of a set of amplifiers 123, to produce successive values of correction voltage, which are of opposite polarity to the corresponding current difference values. These correction voltage values are successively applied from amplifier A1 to second electrode G2-1, to thereby reduce the amount of difference between the current values which are successively sensed during field V2 and the reference level $I_{ref}$. Thus, the successive current difference values which are derived during second field V2 will be substantially smaller than those during the first field V1, as shown by signal 133 in FIG. 6.

As these new current difference values are successively output in digital form from A/D converter 117 during field V2, the corresponding memorized current difference values in memory section M1 are successively transferred through a selector switch SW2-1 of selector switches 121 to an input of adder 118, to be added to the newly derived current difference values. The results of these additions are then stored in memory section M1 of memory 120, replacing the previously stored current difference values.

During the succeeding field V3, the above process is repeated. In this case, the values of correction voltage which are successively output from amplifier section A1 will be slightly different from those produced during field V2, and provide more accurate compensation of the successively produced electron beam currents. Thus, the current difference values produced during field V3 will be close to zero, i.e. signal 133 shown in FIG. 6 is held close to the reference level $I_{ref}$. This concludes the process of deriving compensation data, i.e. the data values left stored in memory section A1, for producing uniformity of the emission characteristics of electron beams emitted from cathode K1 of cathodes 10 during successive 1H intervals of each field interval.

The potential of voltage 131-1 applied to electrode G1-1 is now returned to the low (cut-off) potential, switches SW1-1 and SW1-2 of switches 119 are respectively opened and closed, and switches SW2-1 and SW2-2 of switches 121 are also respectively opened and closed. The level of voltage 131-2 applied to electrode G1-2 is raised to the enabling potential. The process of deriving compensation data for producing uniformity of the emission characteristics of electron beams emitted from cathode K2 during successive 1H intervals in each field is then executed, in the same way as for cathode K1, and this data is left stored in memory section A2 of memory 122. Compensation data is thereafter successively derived for the remaining cathodes, and stored in corresponding memory sections A3, etc.

Upon completion of the above correction data derivation processing, the voltage 132 applied to G4 electrode 16 is returned to the normal (i.e. high, positive) level. Thereafter display operation is performed in substantially the same manner as described for the cathode ray tube example of FIG. 1 above. However in this condition the memory 120 functions only as a read-only memory. At the start of application of an emission enabling voltage level to each of the vertical scanning electrodes 12 during vertical scanning, i.e. at the start of each 1H interval, the correction data values which correspond to that specific one of vertical scanning electrodes 12 are read out simultaneously from all of memory sections A1, A2, ... of memory 122, and are applied as correction voltages to the corresponding ones of the set of second electrodes 14a. In this way, deviations of electron beam emission characteristics between the various electron beam sources are eliminated, i.e. in a condition in which identical potentials are applied to all of the control electrodes 13, a uniform level of display brightness and color will be produced.

It will be understood that the circuit path extending from the G3 electrode 15 to the G2 electrodes 14a in FIG. 5 constitutes a negative feedback loop. Thus, variations in gain characteristics between the amplifiers A1, A2, ..., will have no significant effect upon the operation of the circuit. This factor simplifies the design of the circuits.

In the above embodiment, the process of deriving correction data values for each of cathodes 10 takes three successive field intervals. However it is possible to use a different number of field intervals to complete this processing. Designating this number of field intervals as n, the number of cathodes 10 as m, and the duration of each field interval as $T_\nu$, the total time required to complete derivation of the correction data will be $(m.n.T_\nu)$, for the first embodiment.

It should be noted that it is possible to omit the A/D converter 117 in the circuit of FIG. 5. In this case, the circuit of comparator 116 must be arranged such that if the detected current level is higher than the reference level $I_{ref}$, then a "1" output is produced from the comparator, while if the detected current level is lower then $I_{ref}$, a "−1" output is produced. In other words, comparator 116 is utilized as a one-bit A/D converter. If this is done, a longer time will be required to complete the acquisition of beam emission correction data than is the case when the comparator and A/D converter are separate, the level of noise in the converted digital signal will be sufficiently low so that there will be no need to employ filter 116a of FIG. 5 for noise reduction.

Figure 5B:
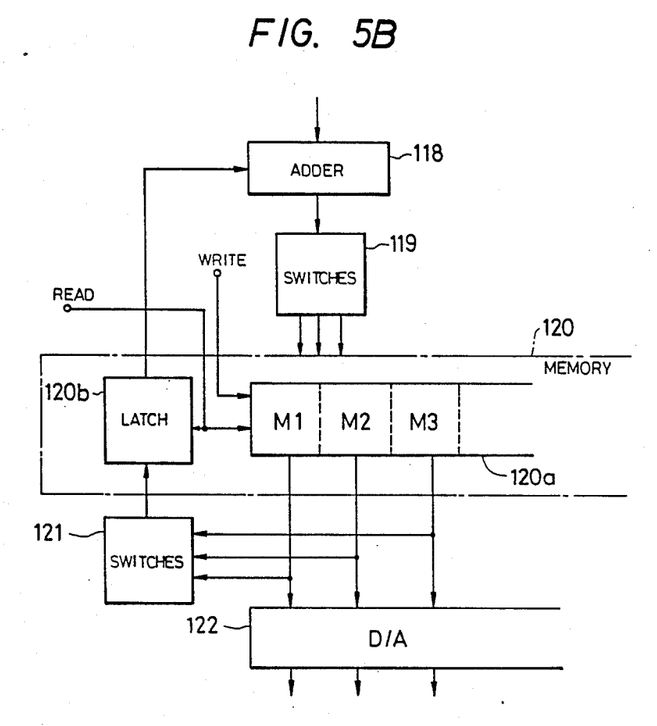
FIG. 5B illustrates a memory latch circuit.
Figure 6:
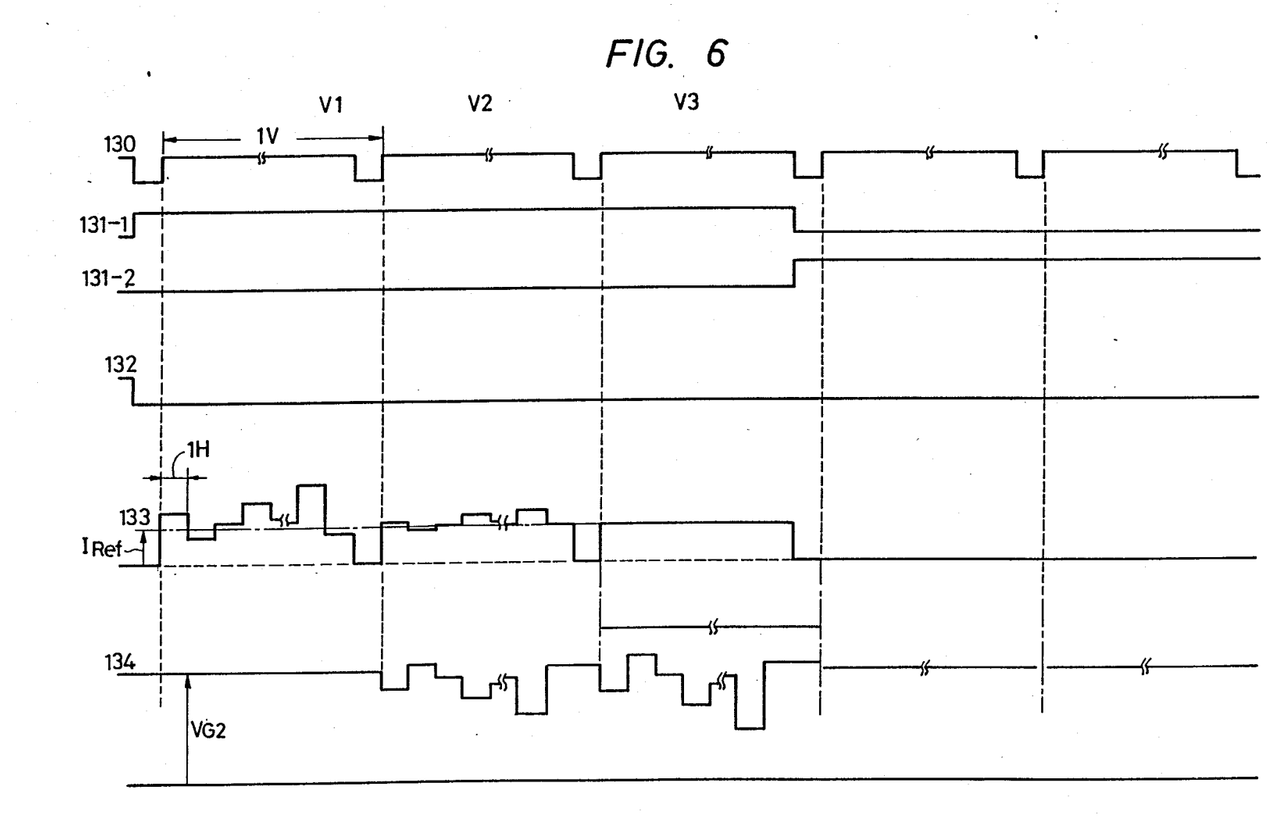
FIG. 6 is a waveform diagram for assistance in describing the operation of a first embodiment of the present invention.

In practice, it will generally be necessary for the memory circuit 120 to be provided with latch output stages, in order to retain stored data values during each time interval in which these values are applied to adder 118, as illustrated in FIG. 5B. When a data value is produced from adder 118 it is stored in a corresponding location, indicated as 120a, by a WRITE signal. Subsequently, before that stored data is to be input to D/A converter 122, it is latched in a corresponding latch 120b, by a READ signal, as shown.

In the above description, correction voltages are applied to the G2 control electrodes 14a. However it would be equally possible to apply the correction voltages to the cathodes 10. In this case the polarity of the correction voltages would of course have to be made identical to that of the current sensing signal 133.

Figure 7A:
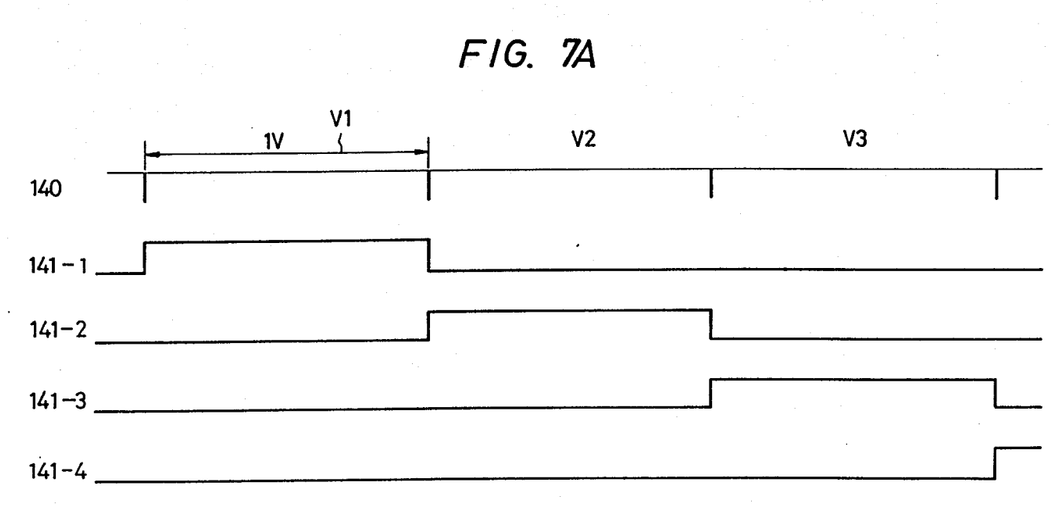
FIGS. 7A and 7B are waveform diagrams for assistance in describing a first embodiment of the present invention.
Figure 7B:
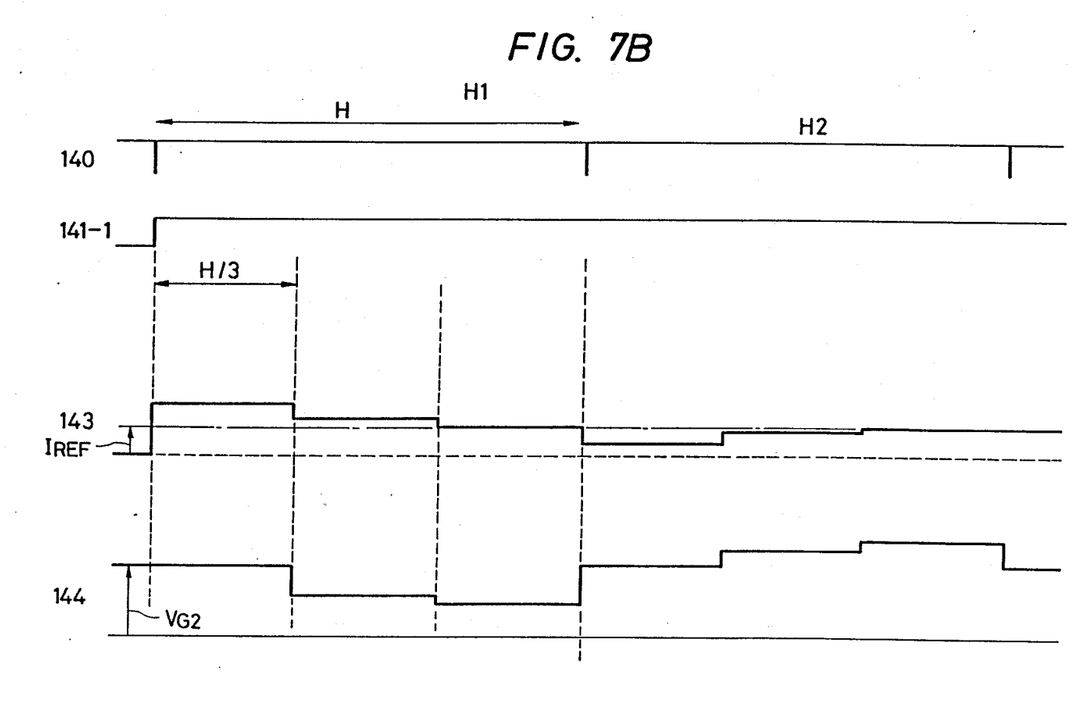

A second embodiment of the drive method of the present invention will now be described, referring to the waveform diagrams of FIGS. 7A and 7B. The configuration of the feedback loop circuit used for the second embodiment can be substantially identical to that shown in FIG. 5A, so that the embodiment will be described referring to FIG. 5A. With the second embodiment, the potential applied to the G4 electrode 16 is set to a suitably low level, as for the first embodiment, and a voltage 141-2 applied to G1-1 is set to the enabling level during one field interval V1, while the voltages applied to the other ones of second electrodes, G1-2, G1-3, ... are held at the cut-off level during field interval V1, as shown in FIG. 7A. Within field interval V1, each of the H1 intervals is divided into three equal subintervals, i.e. each of duration H/3 as shown in FIG. 7B. During the first of these sub-intervals, a current difference value is derived as described for the first embodiment, and is stored in memory section M1. During the second sub-interval, the stored current difference value is added to the newly obtained current difference value, with a correction voltage being applied to electrode G2-1, and the addition result is stored as a new current difference value. This process is repeated in the third sub-interval, to leave a current difference value stored in memory section A1 which corresponds to a specific H1 interval in the field and to emission from cathode K1. During the next H1 interval, this process is repeated, and the corresponding correction data stored in memory section A1. On completion of scanning all of the vertical scanning electrodes 12, i.e. upon completion of deriving correction data for the horizontal block containing cathode K1, the voltage 141-1 applied to electrode G1-1 is returned to the cut-off level, and during the succeeding field V2 the voltage 141-2 applied to electrode G1-2 is held at the enabling level. The process described above is then repeated, for the horizontal block which contains cathode K2, then for the block containing cathode K3, and so on, during each of successive field intervals.

In the above description, each of the H1 intervals is divided into three parts, i.e. each operation of adding a new current difference value to a memorized current difference value and storing the result in memory 120 is completed within a time equal to H/n, where n is an integer. The time required to complete derivation of correction data with the second embodiment will be $m.T_\nu$, as compared with $n.m.T_\nu$ for the first embodiment.

Figure 8:
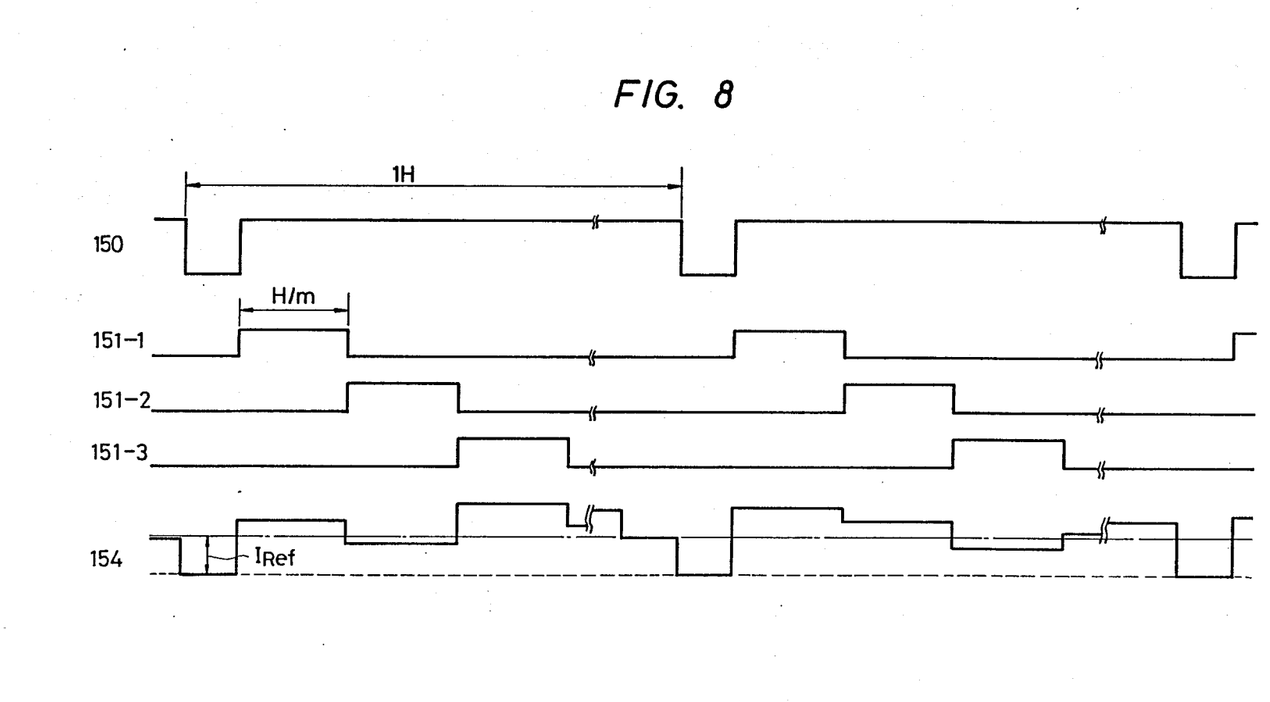
FIG. 8 is a waveform diagram for assistance in describing a third embodiment of the present invention.

A third embodiment of the invention will now be described, referring to the waveform diagram of FIG. 8.

The circuit used to derive and apply correction data can be identical to that of the first embodiment, shown in FIG. 5A. As for the first two embodiments, a sufficiently low potential is applied to the G4 electrode 16 during the process of deriving compensation data. Each of the 1H horizontal scanning intervals is considered to be divided into a number of sub-intervals equal to the number of cathodes 10, i.e. each sub-interval is equal to H/m.

During a first one of these sub-intervals in a first 1H interval, i.e. while a first one of the vertical scanning electrodes 12 is connected to an enabling voltage level, an enabling voltage level is applied to electrode G1-1 of first electrodes 13 while the remainder of the first electrodes 13 are held at the cut-off potential, and a current difference value is thereby produced and stored in memory section M1 of memory 120. During the next H/m sub-interval of that 1H interval, the cut-off potential is applied to electrode G1-1 and the enabling potential is applied to electrode G1-2, and a corresponding current difference value is derived and stored in memory section M2 of memory 120. This process is successively repeated for the remained of the m cathodes 10 during the remainder of that first 1H interval. On completion of that 1H interval, the above process is repeated during the next 1H interval, i.e. while an enabling voltage is being applied to the succeeding one of the vertical scanning electrodes 12. By successive repetitions of this process during scanning of the remaining vertical scanning electrodes 12, a first set of correction data values for all of the horizontal blocks will have been stored in memory 120 by the end of a first field interval. At the start of the next field, the stored values corresponding to the first 1H interval are successively read out from memory sections A1, A2, A3, ..., during respective H/m sub-intervals, and added to new current difference values which are derived during these sub-intervals, with the resultant current difference values being successively stored in memory sections A1, A2, A3 ... The same process is then successively performed for the remaining 1H intervals of the second field. Assuming that the number of data derivation operations n is equal to 3, then the process is repeated once more, leaving a final set of current difference values stored in memory 120.

Designating the number of repetitions of current difference value derivation as n, as for the previous embodiments, the total time required to complete acquisition and storage of the correction data for all horizontal blocks is $n.T_V$ for the third embodiment.

The manner of applying the current difference values during normal display operation is identical for all of the three embodiments described above. That is to say, as each of the vertical scanning electrodes 12 is subjected to the scanning voltage, a set of current difference values which correspond to that specific 1H interval are read out simultaneously from memory 120 sections A1, A2, A3, ... and converted into respective correction voltages. These correction voltages are respectively applied to corresponding ones of the G2 electrodes 14a for the duration of the aforesaid 1H interval, to thereby ensure uniformity of the emission characteristics of the plurality of sources which respectively produce electron beams during the aforesaid 1H interval.

It can thus be understood that data values are sequentially stored in memory 120 during current difference value acquisition processing, but that data values for each 1H interval are read out simultaneously in parallel during normal display operation.

In the descriptions of the above three embodiments, it is assumed that a beam shielding voltage, i.e. a potential of sufficiently low value, is applied to the G4 electrode 16 during the process of deriving compensation data, to cause a flow of electron beam current into the G3 electrode 15. However it would be equally possible to apply a beam shielding potential to any of the electrodes, from the G4 electrode 16 up to and including the anode. Furthermore it would be possible to detect the beam current flow from any of the electrodes between the G2 electrodes 14a and the electrode to which the beam shielding potential is applied.

Although the present invention has been described in the above with reference to specific embodiments, it should be noted that various changes and modifications to the embodiments may be envisaged, which fall within the scope claimed for the invention as set out in the appended claims. The above specification should therefore be interpreted in a descriptive and not in a limiting sense.

What is claimed is:

1. A method of driving a flat type of cathode ray tube having a plurality of electron beam sources for producing respective electron beams, each of said electron beam sources comprising a cathode, a first group of electrodes comprising at least a first electrode for regulating a level of current of the corresponding electron beam and a second electrode disposed outward of said first electrode along the path of said electron beam for generating an electric field to produce said electron beam, and a second group of electrodes disposed outward of said first group of electrodes along said electron beam path, and respectively coupled to receive predetermined values of high voltage for focusing and deflecting said electron beam, the method comprising:

changing the voltage applied to one of said second group of electrodes to a fixed value which is substantially lower than said high voltage value;

successively deriving correction voltage values for each of said electron beams sources by:

enabling emission of an electron beam from said electron beam source by applying a fixed control voltage to said first electrode during a first time interval of fixed duration;

during said first time interval, sensing a current which flows from said electron beam passing into one of said second group of electrodes, and comparing the level of said sensed current with a fixed reference current value to obtain a first current difference value;

storing said first current difference value in a memory, and;

following completion of said first time interval, reading out said stored current difference value from said memory and deriving a first value of said correction voltage based on said current difference value, and;

applying said correction voltage such as to modify a potential difference between said cathode and said first group of electrodes in a direction tending to reduce the difference between said sensed current value and said reference current value, and restoring said voltage applied to said one of the second group of electrodes from said low to said high voltage level.

2. A method of driving a flat type of cathode ray tube according to claim 1 and further comprising, during at least a second predetermined time interval of fixed duration subsequent to said first time interval, with said first value of correction voltage applied to modify said potential difference;

sensing a current flow from said electron beam passing through said one of the second group of electrodes, and comparing the level of said current with said predetermined reference current level to obtain a second current difference value;

adding said memorized first current difference value to said second current difference value to obtain a third current difference value;

memorizing said third current difference value in place of said first current difference value;

following said second time interval, deriving a second value of correction voltage based on said memorized third current difference value, and;

applying said second value of correction voltage to modify said potential difference between said cathode and second group of electrodes.

3. A drive method according to claim 1, in which said correction voltage is applied to one of said first group of electrodes.

4. A drive method according to claim 1, in which said correction voltage is applied to said cathode.

5. A drive method according to claim 1, and further comprising converting said current difference values from analog to digital data form before said operations of addition and memorization are performed, and converting said memorized digital data into analog form for deriving said correction voltage values.

6. A drive method according to claim 5, and further comprising transferring said current difference values, produced by comparison with said reference current value, through a filter having a passband within the low-frequency range, before executing said conversion from analog to digital form.

7. A drive method according to claim 2, in which said plurality of electron beam sources comprise an array of vertically oriented linearly extending cathodes spaced apart at regular intervals horizontally, and an array of vertical scanning electrodes formed as elongated strips horizontally oriented and spaced apart at regular intervals vertically, said vertical scanning electrodes being positioned on an opposite side of said array of cathodes from said first and second electrodes, said first electrodes being positioned in correspondence with respective ones of said cathodes and each being formed with a vertically extending set of apertures for passage of respective electron beams, said apertures being positioned in correspondence with respective ones of said vertical scanning electrodes, whereby during each of said first time intervals, a scanning voltage is applied to a corresponding one of said vertical scanning electrodes for enabling emission of an electron beam from one of said cathodes through an aperture in the one of said control electrodes to which said control voltage is currently applied, while a cut-off voltage level is applied to the remainder of said vertical scanning electrodes to inhibit emission of other electron beams.

8. A drive method according to claim 7, in which said scanning voltage is successively applied during respective horizontal scanning intervals to all of said vertical scanning electrodes during each of successive field intervals.

9. A drive method according to claim 8 in which the duration of each of said time intervals in which said control voltage is applied to each of said control electrodes corresponds to an integral number of said field intervals which is at least equal to two, and in which successive ones of said current difference values corresponding to successively produced electron beams controlled by said control electrode are derived and memorized during at least a first one of said integral number of field intervals and in which values of said correction voltage corresponding to said memorized current difference values are successively produced during a second one of said integral number of field intervals.

10. A drive method according to claim 8, in which the duration of each of said time intervals in which said control voltage is applied to said control electrodes corresponds to one of said field intervals, and in which during said field interval, one of said current difference values is derived and memorized during at least a first portion of each of said horizontal scanning intervals and a corresponding one of said correction voltage values is produced during a second portion of said horizontal scanning interval immediately succeeding said first portion.

11. A drive method according to claim 8, in which the duration of each of said time intervals in which said control voltage is applied to said control electrodes is a portion of one of said horizontal scanning intervals equal to H/m, where H is the duration of each of said horizontal scanning intervals and m is the number of said cathodes, and whereby said control voltage is successively applied to each of said control electrodes during each of said horizontal scanning interval portions and corresponding ones of said current difference values are successively derived and memorized accordingly, during at least a first one of said field intervals, and whereby during a second field interval immediately succeeding said first field interval said memorized current difference values are read out for producing successive ones of said correction voltage values.

12. A method of driving a flat type of cathode ray tube having a parallel array of vertically oriented linear cathodes, a parallel array of horizontally oriented vertical scanning electrodes positioned closely adjacent to said array of cathodes, a first set of electrodes comprising a plurality of first electrodes disposed on an opposite side of said array of cathodes from said vertical scanning electrodes, respectively positioned adjacent to corresponding ones of said cathodes and each formed with a column of apertures positioned in correspondence with respective ones of said vertical scanning electrodes for passage of respective electron beams emitted from said corresponding cathode and a plurality of second electrodes respectively positioned adjacent to corresponding ones of said first electrodes and each formed with a column of apertures positioned in correspondence with said apertures of said corresponding first electrode for passage of respective ones of said electron beams, and a second set of electrodes including a plurality of electrodes for focusing and deflecting all of said electron beams emitted from said second electrodes, the method comprising:

applying respective predetermined voltages to said said second group of electrodes, said voltages being selected such that all of said electron beams emitted from said first group of electrodes will flow into a predetermined one of said second group of electrodes;

successively applying a first enabling voltage to each of said vertical scanning electrodes during successive horizontal scanning intervals while applying a first cut-off voltage to the remainder of said vertical scanning electrodes;

successively applying a second enabling voltage to each of said first electrodes during fixed time intervals while applying a second cut-off voltage to the remainder of said first electrodes, the values of said first and second enabling voltages and first and second cut-off voltages being selected such that an electron beam is emitted through an aperture in said first electrodes only during at least a portion of one of said horizontal scanning intervals, while said first and second enabling voltages are being simultaneously applied to the corresponding ones of said vertical scanning electrodes and first electrodes;

within a first time interval occurring while said first enabling voltage is being applied to one of said first electrodes and said second enabling voltage is being applied to one of said vertical scanning electrodes to produce emission of a corresponding one of said electron beams, said first time interval extending over at least a fixed portion of one of said horizontal scanning intervals, sensing an electron beam current flow into said predetermined one of said second group of electrodes, and comparing the level of said current with a fixed reference current value to obtain a first current difference value;

storing said first current difference value in a memory;

commencing at a time subsequent to said first time interval, during each time interval in which emission of said corresponding one of the electron beams is enabled, reading out said stored current difference value from said memory and deriving a first correction voltage value based on said current difference value, and applying said first correction voltage value to modify a potential difference between said corresponding one of the first electrodes or the corresponding one of the second electrodes and the corresponding one of said cathodes.

13. A drive method according to claim 12 and further comprising, during at least a second time interval subsequent to said first time interval, while said corresponding one of the electron beams is again being emitted and while said first correction voltage value is being applied to modify said potential difference;

sensing said electron beam current flow through said predetermined one of said second group of electrodes, and comparing the level of said current with said first reference value to obtain a second current difference value;

adding said memorized first current difference value to said second current difference value to obtain a third current difference value;

storing said third current difference value in said memory in place of said first current difference value;

commencing at a time subsequent to said second time interval, deriving a second value of correction voltage during each time interval in which emission of said corresponding one of the electron beams is enabled, and applying said correction voltage to modify said potential difference between said corresponding one of the first electrodes or corresponding one of the second electrodes and said corresponding cathode.

* * * * *